Nov. 29, 1960 V. L. HUDSON 2,961,879
INTERMITTENT MOTION DRIVE MECHANISM
Filed Dec. 30, 1958
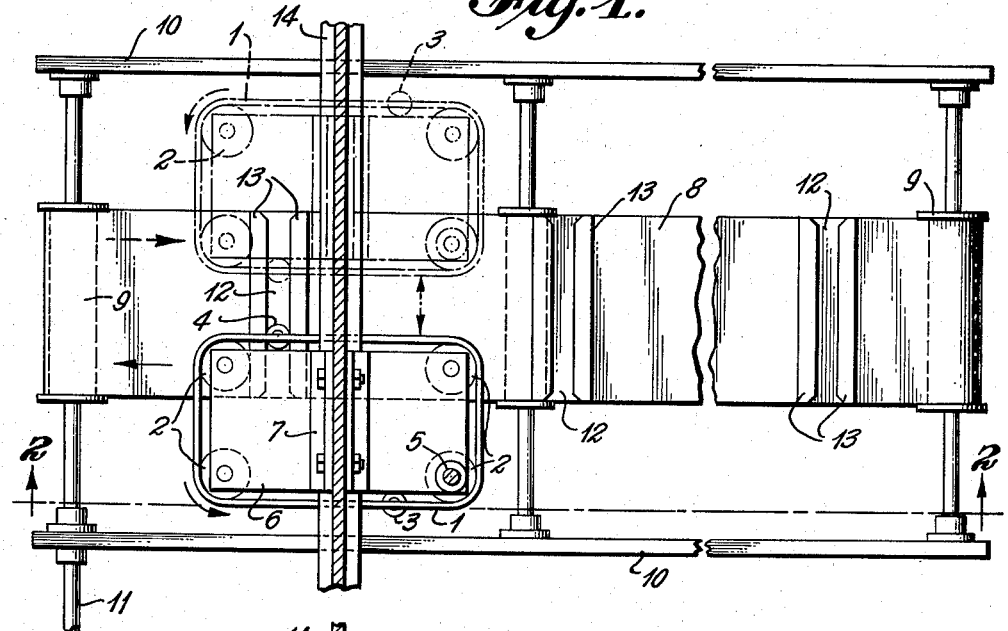
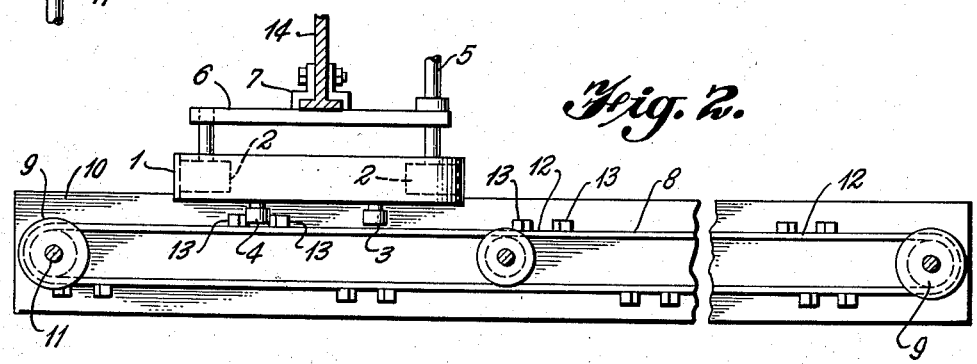
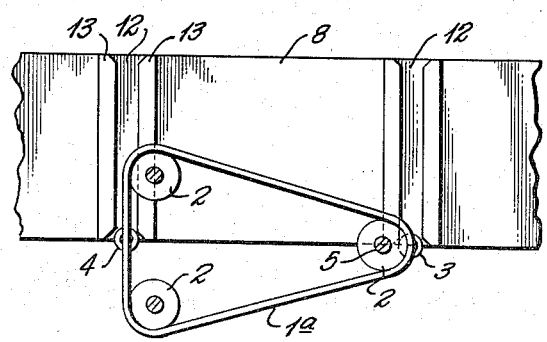
INVENTOR
Vincent L. Hudson
BY Geoffrey Knight
ATTORNEY

United States Patent Office 2,961,879
Patented Nov. 29, 1960

2,961,879
INTERMITTENT MOTION DRIVE MECHANISM

Vincent L. Hudson, Endicott, N.Y., assignor to International Business Machines Corporation, New York, N.Y., a corporation of New York Filed Dec. 30, 1958, Ser. No. 783,853

3 Claims. (Cl. 74—84)

This invention relates to a mechanism for converting continuous motion to intermittent motion.

The prior art discloses many mechanisms for converting continuous motion to intermittent motion, but these mechanisms involve the use of machined gearing with very close tolerances such as the well-known Geneva drive. Other devices require the use of valves also requiring very fine tolerances in their manufacture. Each mechanism shown in the prior art has for its primary purpose either the conversion of continuous movement into intermittent linear motion or continuous movement into intermittent rotary motion.

The intermittent motion achieved may be utilized in many different fields. For instance, it may be required to drive a conveyor belt to transport an item from one work station to another. Each station along the travel of the item may require that no motion be imparted to the item or the conveyor belt for a certain length of time.

It is therefore a general object of this invention to provide a means for obtaining unidirectional intermittent movements, either rotary or linear, or both simultaneously, from a constant speed rotary input shaft.

A still further object of this invention is to provide a drive mechanism which may reverse the direction of intermittent motion imparted to an output unit without reversing the direction of the drive mechanism.

It is still another object of this invention to provide a device of the kind described having a high degree of reliability.

It is yet another object of this invention to provide a device of the kind described which is simple and economical to build and operate and which does not require adherence to close tolerances.

These and other objects are obtained by the use of input and output units comprising endless members which are coupled together by successively effective coupling means. There is a dwell in the drive of the output unit by the input unit during the time that one coupling means is being engaged and its predecessor disengaged. The dwell is permitted by the fact that the configuration of the coupling means and the paths of the endless members are such that no forward component of movement is imparted by the input member to the output member during a predetermined time, even though the input member is continuously running.

In a preferred embodiment the endless members circulate in two planes perpendicular to each other and the endless member of the input unit travels in a rectangular path, one section of which is parallel to a linear section of the path of the other endless member. The output endless member has equidistant spaced transverse camming cleats which are successively engaged by lugs on the input endless member. Each lug first travels part way across the output endless member, moving between a pair of camming cleats without moving the output endless member; then turns through a right angle and drives the output member for a prescribed distance. Finally the lug takes an additional right angle turn and moves back across the output endless member, becoming disengaged from the cleats as a following lug engages the next pair of cleats.

Other objects of the invention will be pointed out in the following description and claims and illustrated in the accompanying drawings, which disclose, by way of example, the principle of the invention and the best mode which has been contemplated of applying that principle.

In the drawings:

Fig. 1 is a plan view of a conveyor belt drive embodying the invention.

Fig. 2 is a side elevation of the conveyor belt drive.

Fig. 3 is another embodiment of the drive mechanism showing a different configuration of the driving belt.

Referring to Figs. 1 and 2 the invention is illustrated for purposes of example, with an endless driving belt 1 extending around and supported by four pulleys 2. One of these pulleys 2 is continuously driven by a shaft 5. The shaft 5 can be driven by any suitable means which will impart continuous rotary motion to it. A common expedient would be to mount a rotary driving means on plate 6 to drive shaft 5. Extending from the edge of the driving belt 1 are lugs 3 and 4. The entire input unit is supported by the input unit plate 6. This plate 6 has attached to it a supporting means 7 which allows the plate 6 to be slidably mounted upon a suitable support 14 for the input unit, such as an I beam. The purpose for the slidable mounting of plate 6 will appear presently.

The output unit to which intermittent motion is to be imparted consists of a driven belt 8 extending around and supported by rollers 9 which are in turn supported by any suitable means 10. Intermittent linear motion may be imparted to the driven belt 8 itself, and/or intermittent rotary motion may be obtained through an output shaft 11 attached to one of the rollers 9. Attached to the driven belt 8 are a plurality of pairs of cam plates 13 which form cam grooves 12. These pairs of cam plates 13 are positioned on the driven belt 8 a distance apart equal to the distance between the two paths of the lugs 3 and 4 which are transverse to the direction of movement of the driven belt 8. The input and output units are positioned in such a way that the lugs 3 and 4 ride within the cam grooves 12 while engaged.

A complete cycle of operation will now be described. In Fig. 1 driving belt 1 is being driven by the shaft 5 in the direction shown by the arrow. At the point of operation shown in Fig. 1, lug 4 which is within the cam groove 12 is imparting motion to the driven belt 8 in the direction of the arrow shown on belt 8. At the same time, counterclockwise rotary motion is being imparted to the output shaft 11 to be utilized by any suitable utilization means which requires intermittent rotary motion. Lug 3, which is traveling in a direction opposite to the direction of movement of the driven belt 8 is free of any cam groove, and is returning to a position to engage the next succeeding cam groove 12. When lug 4 has completed the path parallel to the direction of movement of the driven belt 8 and starts traveling in the path transverse to the desired movement of the driven belt 8, the lug 4 will merely travel parallel to and impart no motion to the cam plate 13. As lug 4 leaves its cam groove, lug 3 will be entering the next cam groove. Both lugs will be traveling parallel to the cam plates or transverse to the desired movement of a driven belt 8 and no motion will be imparted to the driven belt 8. While the lugs are traveling in these two paths, the belt will be locked in the stationary position by the lugs. As soon as lug 3 starts to travel in the direction of the desired movement of the driven belt 8, force will be applied to the cam plate 13 in which lug 3 is then riding and again motion will be imparted to the driven belt 8 and the output shaft 11. As lug 3 starts a direction of movement parallel to the cam plates and transverse to the desired direction of movement of the driven belt 8, movement of the driven belt 8 will cease. As lug 3 proceeds to leave the cam groove 12, lug 4 will have returned to a position where it will enter the next succeeding cam grove to start another cycle of operation.

If it is desired to reverse the direction of intermittent motion impaired to the driven belt 8 or the output shaft 11, without reversing the direction of movement of the driving belt 1, the input unit plate may be positioned as shown by the dotted lines in Fig. 1. With the input unit in this position, intermittent linear or rotary motion will be in the direction shown by the dotted arrow on the driven belt 8.

Fig. 3 shows another configuration of the driving belt, here identified at 1a. Lugs 3 and 4 are shown either entering or leaving a cam groove 12 dependent upon the direction of rotation of the driving belt 1. While the lugs are traveling along the long sides of the triangular configuration, there will be a substantial component of direction parallel to the desired direction of movement of the driven belt 8. As shown in Fig. 3 when the lug 4 is traveling along a portion of the short side of the triangular configuration and lug 3 is not engaged with a camming element, no motion will be imparted to the driven belt 8.

Figs. 1 and 2 show not only that the input unit plate 6 may be in a different relative position to the driven belt 8, but also that the driven belt 8 may be of any desired length. This would show uses of the invention wherein the desired intermittent motion could be primarily linear, such as a long conveyor belt upon which items to be worked upon are placed, or the belt 8 could be made very short when only intermittent rotary motion on the output shaft 11 is desired.

The input unit in all figures may be rigidly mounted if desired, and the direction of intermittent motion reversed merely by reversing the constant rotary motion applied to the drive shaft 5.

The period between intermittent movements of the driven belt 8 may also be varied. In the embodiments shown, the period could be made twice as great by removing one of the lugs 3 or 4. The period could also be varied without changing the spacing of the lugs by varying the length of the driving belt 1 in the direction transverse to the direction of movement of the driven belt 8. Many variations of periods could be achieved by providing a belt adapted to receive many lugs. The lugs would have to be placed on the driving belt 1 so that one lug will be disengaged from a camming element before motion is imparted to the next succeeding camming element by the next lug.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a device of the class described, a pair of endless members mounted to circulate in paths lying in respective planes perpendicular to each other, said paths including linear sections adjacent to each other having at least major components of their directions of movement parallel to each other, means for continuously driving one of said members, the path of said continuously driven member including a second linear section perpendicular to said linear section of said other member, camming means on said other member, and at least one lug on said continuously driven member adapted to engage said camming means while traveling along said two stated linear sections of the path of said constantly driven member to drive said other member while travelling along said linear section of said other member, said camming means having straight sides permitting movement of said lug in relation thereto while traveling along said perpendicular linear section without movement of said other member.

2. In a device of the class described, a circulatable endless flexible driven member adapted for intermittent circulatory motion in a desired direction of movement, a plurality of pairs of cleats transversely mounted on said driven member at uniformly spaced intervals, a circulatable flexible driving member adapted for continuous unidirectional circulatory motion in a path providing path segments for effective operation of said driving member in a direction substantially parallel to the desired direction of movement of said driven member and in a direction normal to the desired direction of movement of said driving member, and a plurality of lugs attached to said driving member adapted to engage said cleats on said driven member in coupling relationship for driving said driven member when said driving member moves in the path segment substantially parallel to movement of said driven member, and for restraining movement of said driven member when said driving member moves in the path segment normal to the desired movement of said driven member.

3. In a device of the class described, a circulatable endless flexible driven member adapted for intermittent circulatory motion in either of two opposite desired directions of movement, a plurality of pairs of cleats transversely mounted on said driven member at uniformly spaced intervals, a circulatable flexible driving member adapted for continuous unidirectional circulatory motion in a path providing a segment for effective operation of said driving member in a direction substantially parallel to one of said two opposite desired directions of movement of said driven member, another segment for effective operation of said driving member in a direction substantially parallel to the other of said two opposite desired directions of movement of said driven member and segments for effective operation of said driving member in a direction normal to the desired directions of movement of said driving member, a plurality of lugs attached to said driving member adapted to engage said cleats on said driven member in coupling relationship for driving said driven member when said driving member moves in the path segments substantially parallel to movement of said driven member, and for restraining movement of said driven member when said driving member moves in the path segments normal to the desired movement of said driven member, and positionable means for mounting said driving member and adapted to be positioned on either side of a transverse section of said driven member for presenting said driving member to drive said driven member in either of said two opposite desired directions of movement.

References Cited in the file of this patent

UNITED STATES PATENTS

| | | |
|---|---|---|
| 659,810 | Cherry | Oct. 16, 1900 |
| 1,775,029 | Hippenmyer | Sept. 2, 1930 |